United States Patent
Ohnishi

(10) Patent No.: US 7,728,903 B2
(45) Date of Patent: Jun. 1, 2010

(54) FOCUS ADJUSTMENT DEVICE, FOCUS ADJUSTMENT METHOD AND CAMERA

(75) Inventor: Naoyuki Ohnishi, Kawasaki (JP)

(73) Assignee: Nikon Corporation, Tokyo (JP)

( * ) Notice: Subject to any disclaimer, the term of this patent is extended or adjusted under 35 U.S.C. 154(b) by 586 days.

(21) Appl. No.: 11/604,325

(22) Filed: Nov. 27, 2006

(65) Prior Publication Data

US 2007/0122137 A1    May 31, 2007

(30) Foreign Application Priority Data

Nov. 30, 2005    (JP)    ............... 2005-345182

(51) Int. Cl.
  G03B 13/00    (2006.01)
  H04N 5/232    (2006.01)
  G03B 3/00     (2006.01)
(52) U.S. Cl. ................ 348/345; 396/121; 396/124
(58) Field of Classification Search ......... 396/120–123; 348/345
  See application file for complete search history.

(56) References Cited

U.S. PATENT DOCUMENTS 5,597,999 A * 1/1997 Kinba et al. ............. 250/201.7
5,815,748 A * 9/1998 Hamamura et al. ......... 396/104
7,058,294 B2 * 6/2006 Nakahara .................... 396/104
7,565,072 B2 * 7/2009 Ito ............................ 396/121
2005/0168621 A1 * 8/2005 Kageyama et al. ......... 348/349
2006/0165403 A1   7/2006 Ito

FOREIGN PATENT DOCUMENTS

JP    A 10-39196    2/1998
JP    A 2002-328293    11/2002

* cited by examiner

Primary Examiner—Melissa J Koval
Assistant Examiner—Leon W Rhodes
(74) Attorney, Agent, or Firm—Oliff & Berridge, PLC

(57) ABSTRACT

A focus adjustment device includes: a first focus detection unit that detects a focus adjustment state for a subject image in a first focusing area; a second focus detection unit that detects a focus adjustment state in a second focusing area through a method different from a method adopted by the first focus detection unit; a judgment unit that makes a judgment as to whether or not the first focusing area and the second focusing area have a specific positional relationship; and a focus adjustment unit that executes focus adjustment based upon focus detection results obtained via the first focus detection unit and focus detection results obtained via the second focus detection unit when the judgment unit decides that the first focusing area and the second focusing area have the specific positional relationship.

23 Claims, 10 Drawing Sheets

FOCUS ADJUSTMENT DEVICE, FOCUS ADJUSTMENT METHOD AND CAMERA

INCORPORATION BY REFERENCE

The disclosure of the following priority application is herein incorporated by reference:

Japanese Patent Publication No. 2005-345182 filed Nov. 30, 2005

BACKGROUND OF THE INVENTION

1. Field of the Invention

The present invention relates to an optical device and a camera having a focus adjustment function.

2. Description of Related Art

Japanese Laid Open Patent Publication No. 2002-328293 discloses an automatic focus detection/adjustment method that may be adopted in a camera, achieved by adopting a hybrid autofocus (AF) technology whereby two AF methods, the phase detection method and the contrast detection method, are used in combination.

SUMMARY OF THE INVENTION

However, in the hybrid AF method disclosed in Japanese Laid Open Patent Publication No. 2002-328293, only a limited focusing areas can be used for the focus adjustment through the hybrid AF, and thus, the advantages of the two AF methods cannot be utilized to the full extent.

According to the 1st aspect of the invention, a focus adjustment device comprises: a first focus detection unit that detects a focus adjustment state for a subject image in a first focusing area; a second focus detection unit that detects a focus adjustment state in a second focusing area through a method different from a method adopted by the first focus detection unit; a judgment unit that makes a judgment as to whether or not the first focusing area and the second focusing area have a specific positional relationship; and a focus adjustment unit that executes focus adjustment based upon focus detection results obtained via the first focus detection unit and focus detection results obtained via the second focus detection unit when the judgment unit decides that the first focusing area and the second focusing area have the specific positional relationship.

According to the 2nd aspect of the invention, in the focus adjustment device according to the 1st aspect, it is preferred that there is further provided a second area setting unit that sets the second focusing area in correspondence to an optional position within an image plane.

According to the 3rd aspect of the invention, in the focus adjustment device according to the 1st aspect, it is preferred that the first focusing area and the second focusing area having the specific positional relationship at least partially overlap.

According to the 4th aspect of the invention, in the focus adjustment device according to the 1st aspect, it is preferred that the first focusing area and the second focusing area having the specific positional relationship are present in close proximity to each other.

According to the 5th aspect of the invention, in the focus adjustment device according to the 1st aspect, it is preferred that the focus adjustment unit first executes focus adjustment based upon the focus detection results obtained via the first focus detection unit and then executes focus adjustment based upon the focus detection results obtained via the second focus detection unit.

According to the 6th aspect of the invention, in the focus adjustment device according to the 1st aspect, it is preferred that: the first focus detection unit detects the focus adjustment state in a plurality of focusing areas; and the focus adjustment device further comprises a first area setting unit that sets at least one focusing area as the first focusing area.

According to the 7th aspect of the invention, in the focus adjustment device according to the 1st aspect, it is preferred that when the first focusing area and the second focusing area do not have the specific positional relationship, the focus adjustment unit executes focus adjustment based upon the focus detection results obtained via the second focus detection unit.

According to the 8th aspect of the invention, in the focus adjustment device according to the 1st aspect, it is preferred that: there is further provided a subject area definition unit that defines a subject area corresponding to a subject assuming a position in the second focusing area; and the judgment unit makes a judgment as to whether or not the first focusing area is present within the subject area defined via the subject area definition unit.

According to the 9th aspect of the invention, in the focus adjustment device according to the 2nd aspect, it is preferred that: there is further provided a subject area definition unit that defines a subject area corresponding to a subject assuming a position in the second focusing area defined via the second area setting unit; and the judgment unit makes a judgment as to whether or not the first focusing area is present within the subject area defined via the subject area definition unit.

According to the 10th aspect of the invention, in the focus adjustment device according to the 1st aspect, it is preferred that when the judgment unit decides that there is a plurality of first focusing areas having the specific positional relationship to the second focusing area, the focus adjustment unit executes the focus adjustment based upon focus detection results provided by the first focus detection unit for the plurality of first focusing areas.

According to the 11th aspect of the invention, in the focus adjustment device according to the 10th aspect, it is preferred that the focus adjustment unit determines a lens driving direction along which a lens is to be driven for the focus adjustment by the second focus detection unit based upon the focus detection results obtained via the first focus detection unit for the plurality of focusing areas.

According to the 12th aspect of the invention, in the focus adjustment device according to the 1st aspect, it is preferred that: the first focus detection unit executes a phase detection method; and the second focus detection unit executes a contrast detection method.

According to the 13th aspect of the invention, a focus adjustment method comprises: making a judgment as to whether or not a first focusing area detecting a focus adjustment state achieved for a subject image through a first focus detection method and a second focusing area detecting a focus adjustment state achieved through a second focus detection method different from the first focus detection method, have a specific positional relationship; and executing focus adjustment based upon focus detection results obtained through the first focus detection method and focus detection results obtained through the second focus detection method when the first focusing area and the second focusing area are determined to have the specific positional relationship.

According to the 14th aspect of the invention, in the focus adjustment method according to the 13th aspect, it is preferred that the method comprises setting the second focusing area in correspondence to an optional position within an image plane.

According to the 15th aspect of the invention, in the focus adjustment method according to the 13th aspect, it is preferred that the first focusing area and the second focusing area having the specific positional relationship at least partially overlap.

According to the 16th aspect of the invention, in the focus adjustment method according to the 13th aspect, it is preferred that the first focusing area and the second focusing area having the specific positional relationship are present in close proximity to each other.

According to the 17th aspect of the invention, in the focus adjustment method according to the 13th aspect, it is preferred that focus adjustment is first executed based upon the focus detection results obtained through the first focus detection method and then focus adjustment is executed based upon the focus detection results obtained through the second focus detection method.

According to the 18th aspect of the invention, in the focus adjustment method according to the 13th aspect, it is preferred that the focus adjustment state is detected in a plurality of focusing areas through the first focus detection method and at least one of the focusing areas is designated as the first focusing area.

According to the 19th aspect of the invention, in the focus adjustment method according to the 13th aspect, it is preferred that when the first focusing area and the second focusing area do not have the specific positional relationship, focus adjustment is executed based upon the focus detection results obtained through the second focus detection method.

According to the 20th aspect of the invention, in the focus adjustment method according to the 13th aspect, it is preferred that: a subject area corresponding to a subject assuming a position in the second focusing area is defined; and a judgment as to whether or not the first focusing area and the second focusing area have the specific positional relationship is made by judging whether or not the first focusing area is present within the subject area having been defined.

According to the 21st aspect of the invention, in the focus adjustment method according to the 14th aspect, it is preferred that: a subject area corresponding to a subject assuming a position in the second focusing area having been defined; and the judgment as to whether or not the first focusing area and the second focusing area have the specific positional relationship is made by judging whether or not the first focusing area is present within the subject area having been defined.

According to the 22nd aspect of the invention, in the focus adjustment method according to the 13th aspect, it is preferred that when a plurality of first focusing areas are judged to have the specific positional relationship to the second focusing area, the focus adjustment is executed based upon the focus detection results obtained through the first focus detection method for the plurality of first focusing areas.

According to the 23rd aspect of the invention, in the focus adjustment method according to the 22nd aspect, it is preferred that a lens driving direction along which a lens is to be driven for the focus adjustment through the second focus detection method, is determined based upon the focus detection results obtained through the first focus detection method for the plurality of first focusing areas.

According to the 24th aspect of the invention, in the focus adjustment method according to the 13th aspect, it is pre-
ferred that: the first focus detection method is a phase detection method; and the second focus detection method is a contrast detection method.

According to the 25th aspect of the invention, a camera comprises a focus detection device according to any one of the 1st through the 12th aspects.

DESCRIPTION OF PREFERRED EMBODIMENTS

First Embodiment

Figure 1:
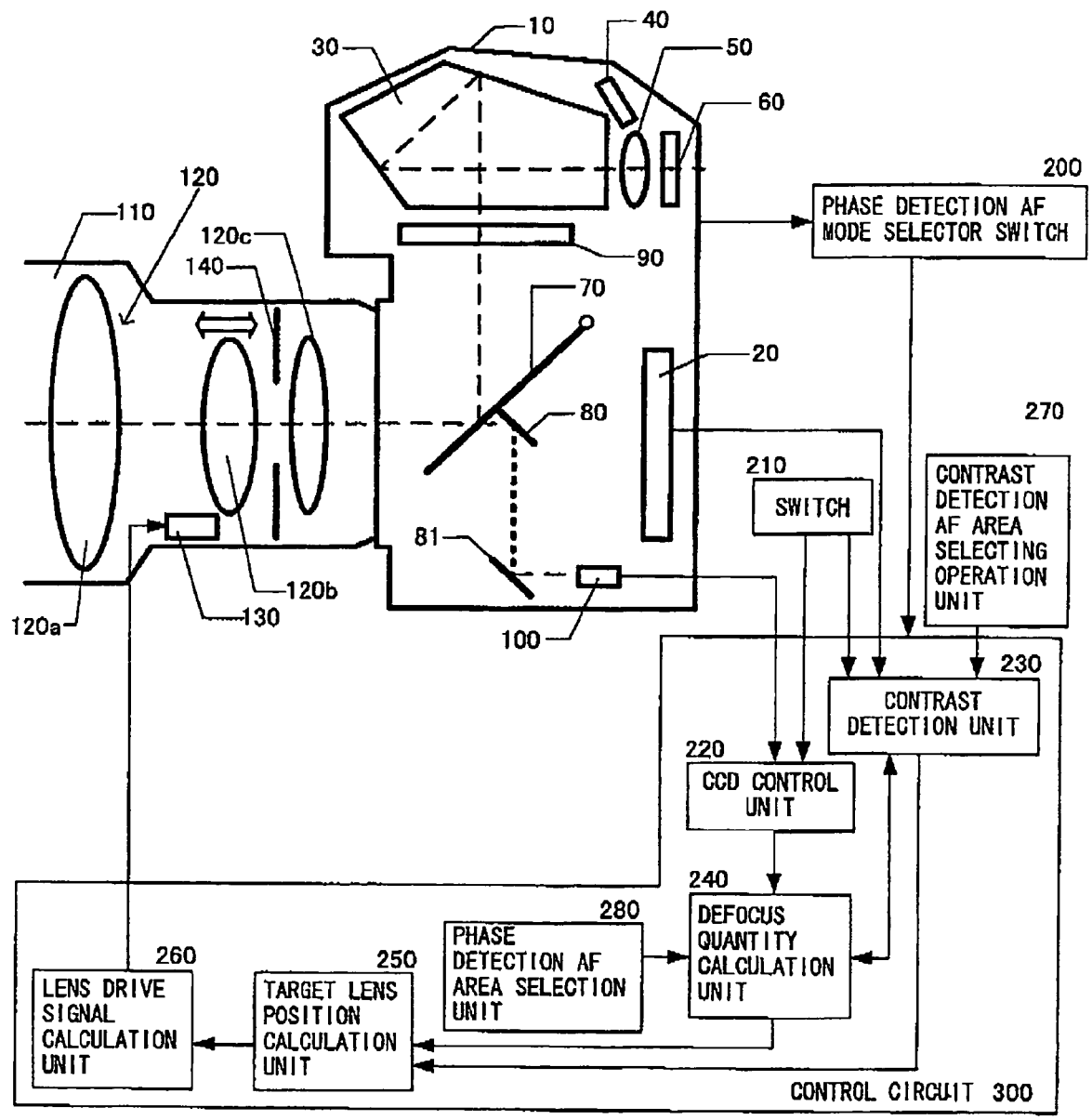
FIG. 1 is a block diagram of a camera that includes the focus adjustment device according to the present invention provided as an internal component thereof.

The following is an explanation of the first embodiment of the camera equipped with a focus adjustment device, given in reference to drawings. The camera achieved in the embodiment executes focus detection/adjustment by selecting phase detection AF, contrast detection AF or hybrid AF that uses the two AF methods in combination. FIG. 1 is a block diagram of the essential structure adopted in the camera according to the present invention. An exchangeable lens barrel 110 that includes a photographic lens 120 is detachably mounted at a camera body 10.

The photographic lens 120 constituted with lens groups 120a~120c, an AF drive motor 130 and an aperture member 140 are disposed inside the lens barrel 110. Reference 120b indicates a focus adjustment lens driven by the AF drive motor 130.

Inside the camera body 10, an image sensor 20 that captures a subject image is disposed. The image sensor 20 may be constituted with a CCD or a CMOS. Between the photographic lens 120 and the image sensor 20, a quick return mirror 70 that reflects the subject light having passed through the photographic lens 120 toward a viewfinder optical system is disposed. Part of the subject light is transmitted through a semi-transmissive area of the quick return mirror 70, is reflected downward at a sub mirror 30 and is then reflected at a mirror 81 before it enters a phase detection AF detection element (sensor) 100.

The phase detection AF detection element 100 may include, for instance, a focus detection optical system that splits a focus detection light flux into a pair of focus detection light images and a pair of CCD line sensors that output focus detection signals corresponding to the pair of split light images having entered thereat. The focus detection signals output from the CCD line sensors are input to a control circuit 300, and the control circuit 300 outputs a lens drive signal based upon which the focus adjustment lens 120b is to be driven to the focus match position as described later.

The subject light reflected at the quick return mirror 70 forms an image on a viewfinder screen 90 disposed at a position that is optically equivalent to the position of the image sensor 20. The subject image formed on the viewfinder screen 90 is guided from a pentaprism 30 through a relay lens 50 to an eyepiece unit 60 and is also guided from the pentaprism 30 onto a light receiving surface of a photometering element 40 to form an image thereupon. It is to be noted that the quick return mirror 70 is moved out of the optical path of the subject light during a photographing operation so as to form the subject image on the image sensor 20.

The control circuit 300 is constituted with a CPU, a ROM, a RAM and various peripheral circuits. As shown in FIG. 1, its functional units include a CCD control unit 220 that controls the phase detection AF detection element 100, a defocus quantity calculation unit 240 that calculates the extent of image plane offset (hereafter referred to as a defocus quantity) of the image forming plane relative to an estimated focal plane, a contrast detection unit 230 that calculates a focus evaluation value based upon an imaging signal output from the image sensor 20, a target lens position calculation unit 250 that calculates a target position for the focus adjustment lens 120b based upon the results of the calculation executed by the contrast detection unit 230 and a lens drive signal calculation unit 260 that obtains through an arithmetic operation an AF lens drive signal based upon the target AF lens position.

The defocus quantity calculation unit 240 executes defocus quantity calculation of known art based upon a charge storage signal output from the CCD control unit 220. The subject images formed with a pair of defocus quantity detection light fluxes having passed through different areas of the photographic lens 120 each enter a CCD line sensor. By executing a correlational arithmetic operation on the signals output from the pair of CCD line sensors, a relative positional offset quantity (relative distance) indicating the extent of positional offset of the two images relative to each other is calculated. The distance between the pair of subject images on the pair of CCD line sensors is smaller in the front focus state in which a sharply defined image of the subject is formed via the photographic lens 120 at a position further frontward relative to the estimated focal plane and is greater in the rear focus state in which a sharply defined subject image is formed further rearward relative to the estimated focal plane. In the focus matched state in which the sharply defined subject image is formed at the estimated focal plane, the pair of subject images are aligned relative to each other. By determining the relative positional offset quantity of the pair of subject images as described above, the focus adjustment state achieved by the photographic lens 120, i.e., the defocus quantity, can be ascertained.

The contrast detection unit 230 executes focus evaluation value calculation of the known art by extracting a high frequency component in the imaging signal output from the image sensor 20. In the focus matched state in which a sharply defined image is formed on the image sensor 20 through the photographic lens 120, the blurring around the edges in the subject image is minimized and the maximum contrast is achieved, and thus, the focus evaluation value peaks in the focus matched state.

The target lens position calculation unit 250 calculates the target lens position based upon the defocus quantity calculated by the defocus quantity calculation unit 240. In addition, the target lens position calculation unit 250 calculates a target lens position for the focus adjustment lens 120b, at which the maximum focus evaluation value is achieved, based upon the focus evaluation value calculated by the contrast detection unit 230. Based upon the target lens position calculated by the target lens position calculation unit 250, the lens drive signal calculation unit 260 calculates the extent to which the lens is to be driven and outputs the lens drive signal to the AF drive motor 130. In response to the lens drive signal, the AF drive motor 130 drives the focus adjustment lens 120b forward/backward along the optical axis, and the focus is thus adjusted.

The camera includes an AF mode selector switch 200 and in response to an operation of the AF mode selector switch, an AF selection signal is transmitted to the control circuit 300 to select "phase detection AF" for the AF mode. It is to be noted that the AF mode selector switch 200 does not need to be a mechanical switch, and the AF mode may be switched in a menu screen instead. In addition, the camera includes an AF switch 210 and a contrast detection AF area selecting operation unit 270. As the AF switch 210 is turned on, a signal is transmitted to the control circuit 300 and operations such as photometering and focus detection start in response. In addition, a focusing area for the contrast detection AF (hereafter referred to as contrast detection AF area) can be set in correspondence to a given and optional position on the photographic image plane by operating the contrast detection AF area selecting operation unit 270.

Figure 2:
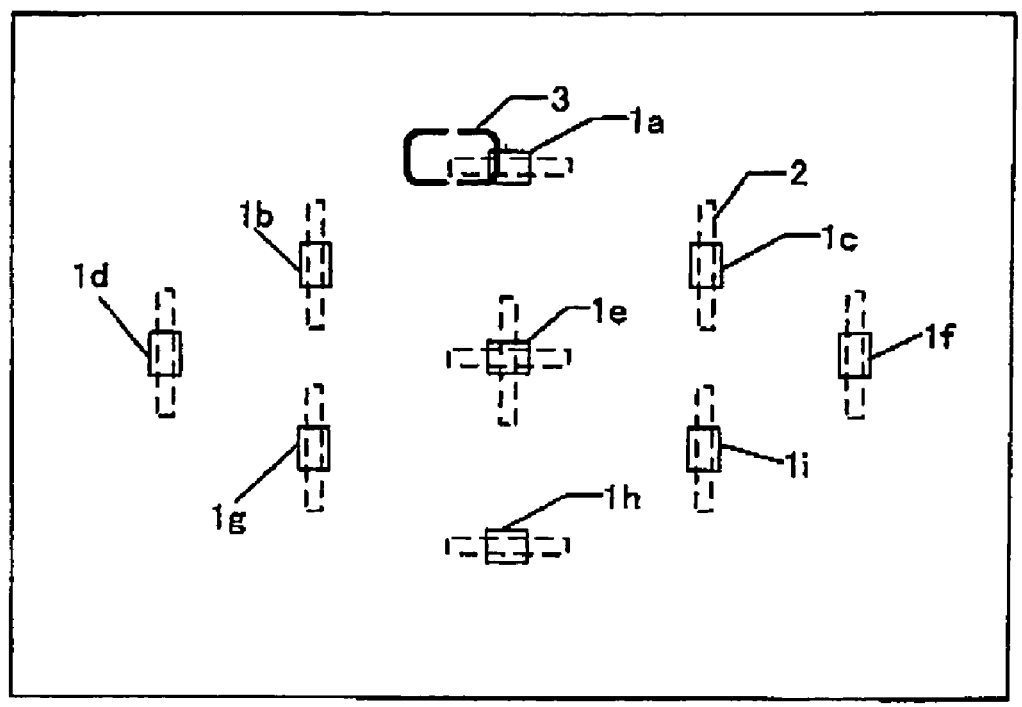
FIG. 2 shows focusing areas, with a phase detection AF area and a contrast detection AF area overlapping each other.

Next, an explanation is given in reference to FIG. 2 on an example of a focusing area arrangement.

FIG. 2 shows nine focusing areas 1a~1i for the phase detection AF (hereafter they are referred to as phase detection AF areas and also they may be collectively referred to simply by using reference numeral 1). Quadrangular areas 2 indicated by the dotted lines, which overlap the individual areas 1a~1i, are images on the primary image plane at the pair of phase detection AF line sensors. Under normal circumstances, the focus is detected by using at least one of these focusing areas in the phase detection AF mode. For instance, the focus may be detected based upon the defocus quantity corresponding to the smallest distance to the camera among the defocus quantities calculated for all the focusing areas. The focus may be detected by adopting any of various methods, e.g., using the defocus quantities corresponding to the individual focusing areas and weighting the defocus quantities corresponding to shorter distances to greater extents. A frame 3 indicated by the bold lines is a focusing area used in the contrast detection AF mode. As explained earlier, the photographer is able to manually adjust the contrast detection AF area 3 to a desired position by operating the contrast detection AF area selecting operation unit 270.

FIG. 2 shows a specific positional relationship between the phase detection AF areas 1 and the contrast detection AF area 3, with the contrast detection AF area 3 partially overlapping the phase detection AF area 1a or the range 2 that can be detected with the phase detection AF sensors. While the phase detection AF areas 1 are superimposed over the subject image within the viewfinder field or on display at the electronic viewfinder, the ranges 2 that can be detected with the phase detection AF sensors are not indicated in the display.

Figure 4:
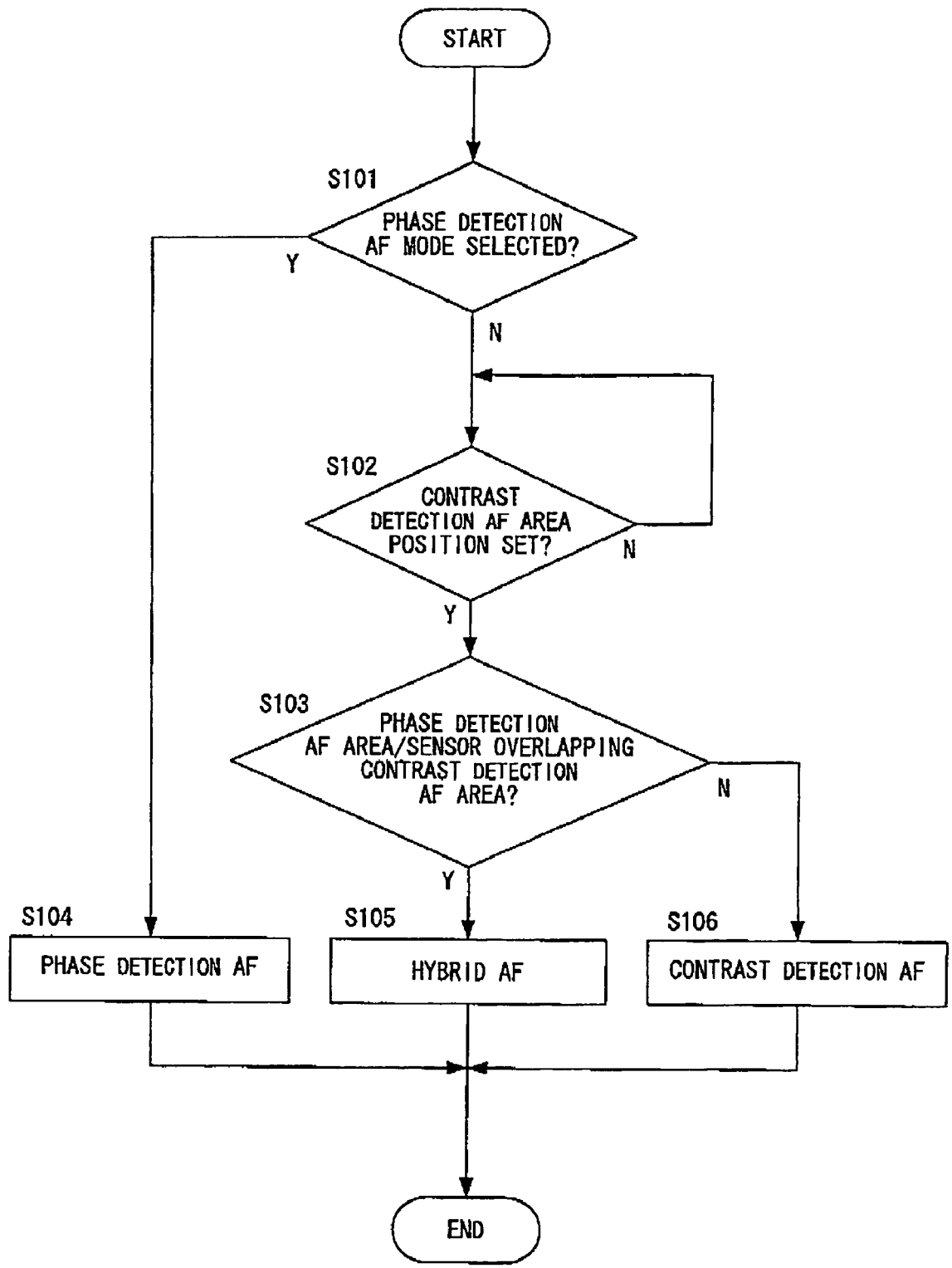
FIG. 4 presents a flowchart of the operation executed in a first embodiment of the present invention.

The following is an explanation of the operation executed in the camera adopting the structure described above, given in reference to the flowchart presented in FIG. 4. The flowchart shows the processing executed by the control circuit 300 in FIG. 1 in conformance to a focus detection/adjustment control program.

In step S101 in FIG. 4, a decision or judgment is made based upon the setting at the AF selector switch 200 as to whether or not the phase detection AF mode has been selected in response to a switching operation by the photographer. If no phase detection AF selection signal has been received and thus it is decided that the phase detection AF mode has not been selected, the current mode is judged to allow engagement of the contrast detection AF mode, and accordingly, the operation proceeds to step S102. If it is decided that the phase detection AF mode has been selected, the operation proceeds to step S104. In step S104, focus detection is executed through the phase detection AF by adopting a method of the known art and then the focus is adjusted based upon the detection results.

In step S102, a decision is made based upon a signal provided from the contrast detection AF area selecting operation unit 270 as to whether or not the position of the contrast detection AF area 3 at which focus adjustment is to be executed through the contrast detection AF has been set. If it is decided that the position of the contrast detection AF area 3 has been set, the operation proceeds to step S103. If, on the other hand, it is decided that the position of the contrast detection AF area 3 has not been set, the operation waits in standby for the position of the contrast detection AF area 3 to be set.

Figure 3:
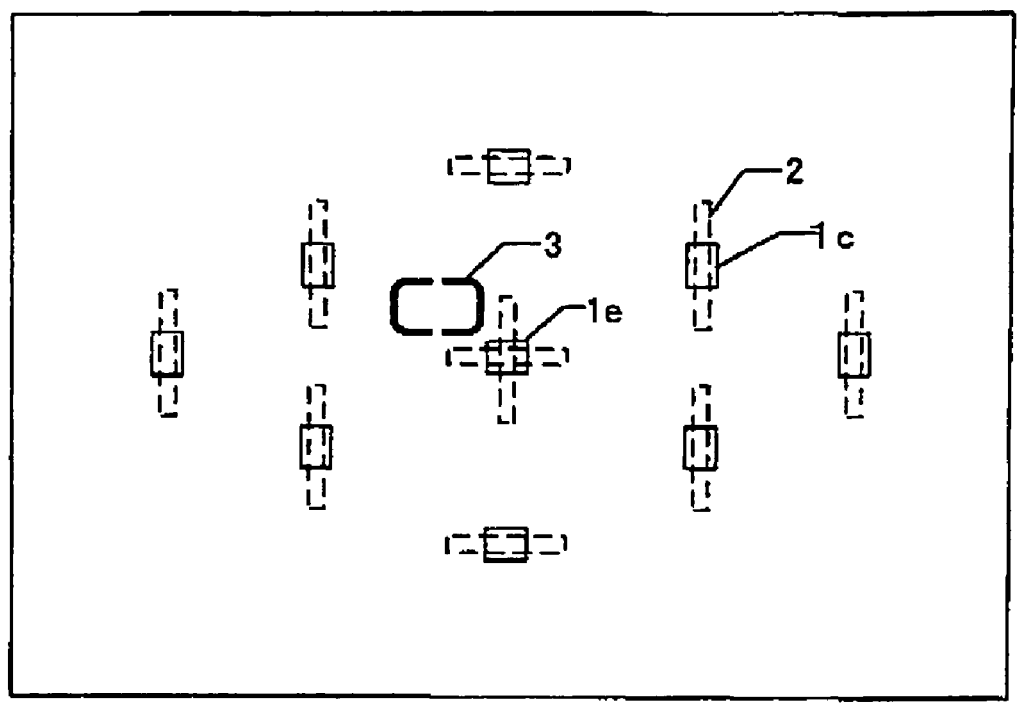
FIG. 3 shows focusing areas without an overlap of a phase detection AF area and a contrast detection AF area.

In step S103, a decision is made as to whether or not the contrast detection AF area 3 having been judged in step S102 to be set, partially overlaps a phase detection AF area 1 or a range 2 that can be detected with the phase detection AF sensors as shown in FIG. 2. If the contrast detection AF area 3 is judged to partially overlap a phase detection AF area 1 or a range 2 detectable with the phase detection AF sensors, the operation proceeds to step S105. If the contrast detection AF area 3 does not overlap either a phase detection AF area 1 or a range 2 detectable with the phase detection AF sensors as shown in FIG. 3, the operation proceeds to step S106 to adjust the focus through the contrast detection AF by adopting a method of the known art.

In step S105, the focus is adjusted through the hybrid AF by combining the phase detection AF and the contrast detection AF. For instance, after calculating the defocus quantities through the phase detection AF, only the lens driving direction may be set, and then a contrast detection AF operation may be executed. Alternatively, after calculating the defocus quantities through the phase detection AF, the AF lens 120b may be first driven to a point close to the focus match position, then the lens may be driven through the contrast method, the focus evaluation value may be next calculated and finally, the lens may be positioned at a point at which the contrast value peaks. In other words, the phase detection AF operation is first executed to determine the driving direction or to drive the focus length to an approximate focus match position through the phase detection AF and then more precise AF operation is executed through the contrast detection AF. As a result, a speedy and highly accurate AF operation is enabled.

As explained above, the following advantages are achieved in the camera in the first embodiment.

(1) When the contrast detection AF area 3, which can be set freely by the photographer through a manual operation, and a phase detection AF area 1 achieve a specific positional relationship by overlapping each other, focus adjustment through the hybrid AF is enabled. Thus, the focus can be adjusted through the hybrid AF with an increased level of freedom in the focusing area selection.

(2) In addition, if the contrast detection AF area 3 and any of the phase detection AF areas 1 or the ranges detectable with the phase detection AF sensors do not have the specific positional relationship to each other, the focus adjustment is executed through the contrast detection AF. In other words, since the position of the contrast detection AF area 3 can be selected without having to take into consideration whether the focus adjustment is to be executed through the contrast detection AF or the hybrid AF, better ease of operation is assured for the photographer.

Second Embodiment

Figure 5:
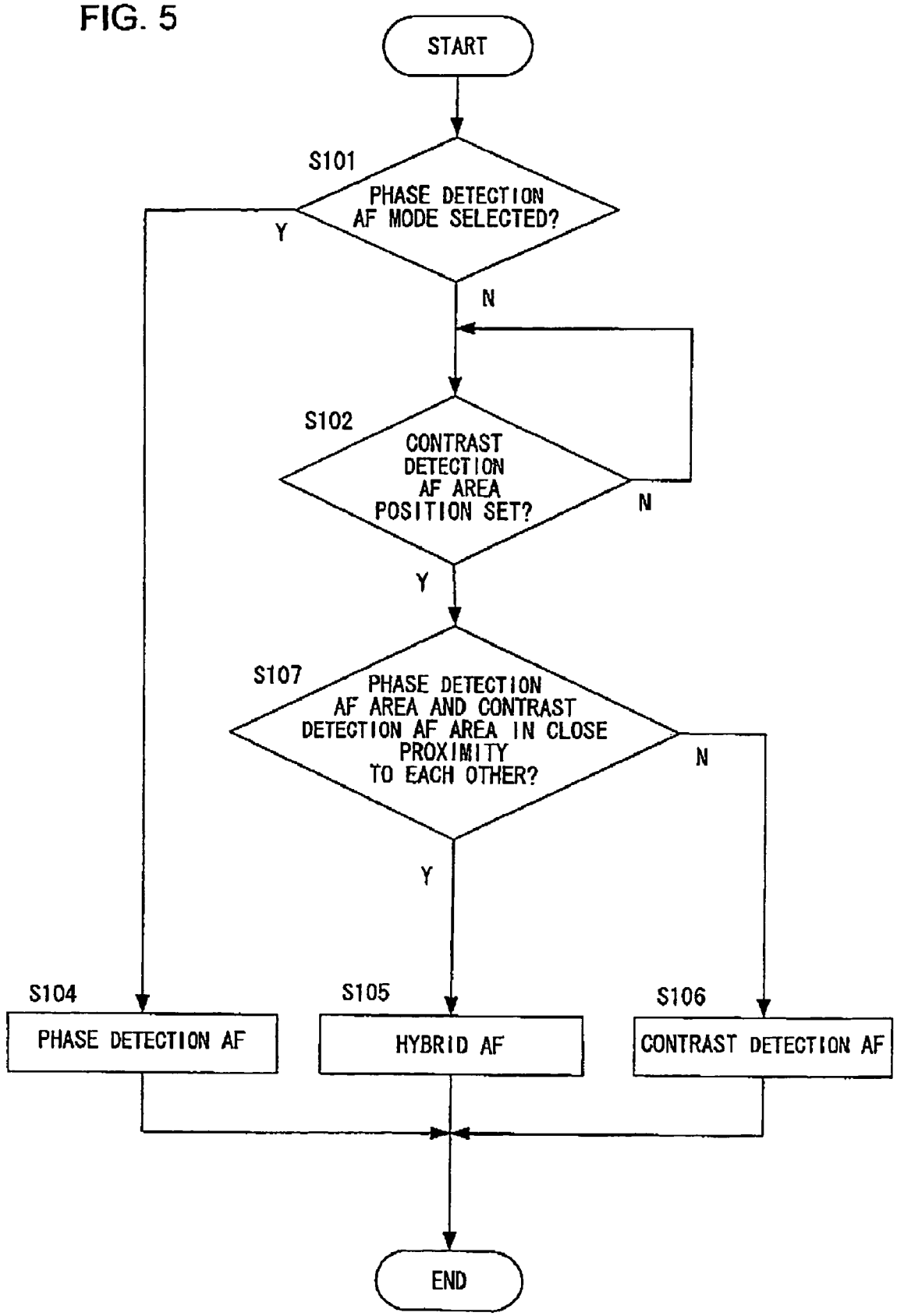
FIG. 5 presents a flowchart of the operation executed in a second embodiment of the present invention.

The following is an explanation of the camera equipped with a focus adjustment device achieved in the second embodiment, given in reference to the flowchart presented in FIG. 5. It is to be noted that the same step numbers are assigned to steps in the flowchart in FIG. 5, in which processing identical to that in the corresponding steps in the flowchart in FIG. 4 is executed, so as to preclude the necessity for a repeated explanation thereof. In addition, the components of the camera are identical to those of the camera equipped with the focal adjustment device achieved in the first embodiment.

FIG. 3 shows the positional relationship between the phase detection AF areas 1 and the contrast detection AF area 3, as assumed in the second embodiment. The focusing areas for phase detection AF in the second embodiment are arranged in a manner similar to the arrangement of the focusing areas assumed in the first embodiment, as shown in FIG. 2. FIG. 3 presents an example in which the contrast detection AF area 3 is set in close proximity to the phase detection AF area 1a, without actually overlapping any of the phase detection AF areas 1 or the ranges 2 detectable with the phase detection AF sensors.

If an affirmative decision is made in step S102 in FIG. 5, i.e., if it is decided that the position of the contrast detection AF area 3 has been set, the operation proceeds to step S107.

In step S107, a decision is made as to whether or not a specific positional relationship is achieved by a phase detection AF area 1 and the contrast detection AF area 3, with them present in close proximity to each other. In the example presented in FIG. 3, the central phase detection AF area 1e and the contrast detection AF area 3 are judged to be in close proximity to each other. After making an affirmative decision in step S107, the operation proceeds to step S105 to adjust the focus through the hybrid AF. If, on the other hand, a negative decision is made in step S107, i.e., if it is decided that no phase detection AF area 1 is present in close proximity to the contrast detection AF area 3, the operation proceeds to step S106 to adjust the focus through the contrast detection AF. The decision as to whether or not a phase detection AF area 1 and the contrast detection AF area 3 are present in close proximity to each other may be made as follows.

Figure 6A:
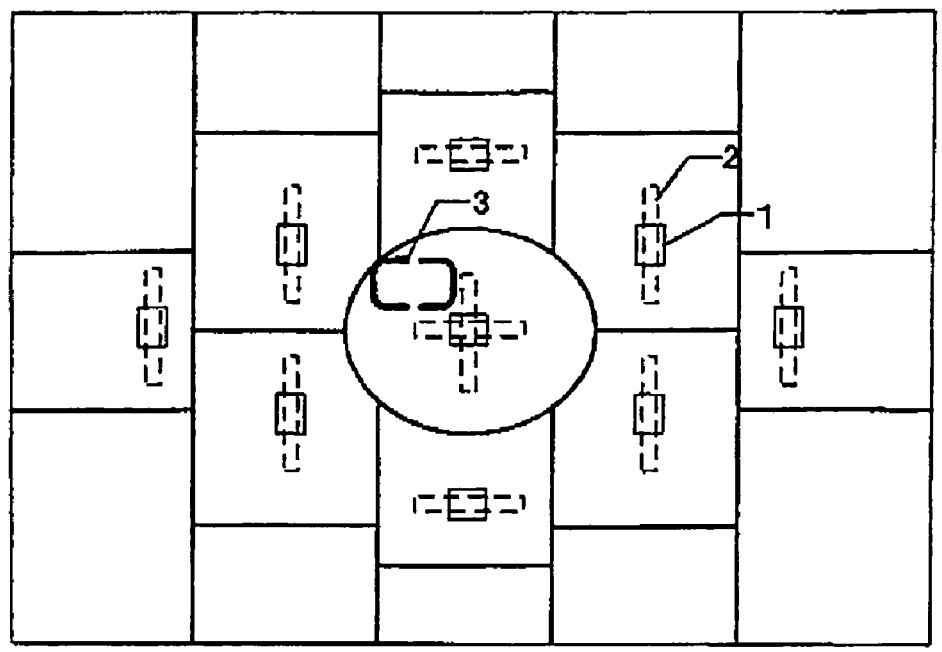
FIGS. 6A and 6B show focusing areas set on the image plane divided into blocks, with FIG. 6A showing a contrast detection AF area set close to a phase detection AF area and FIG. 6B showing a contrast detection AF area set away from the phase detection AF areas.
Figure 6B:
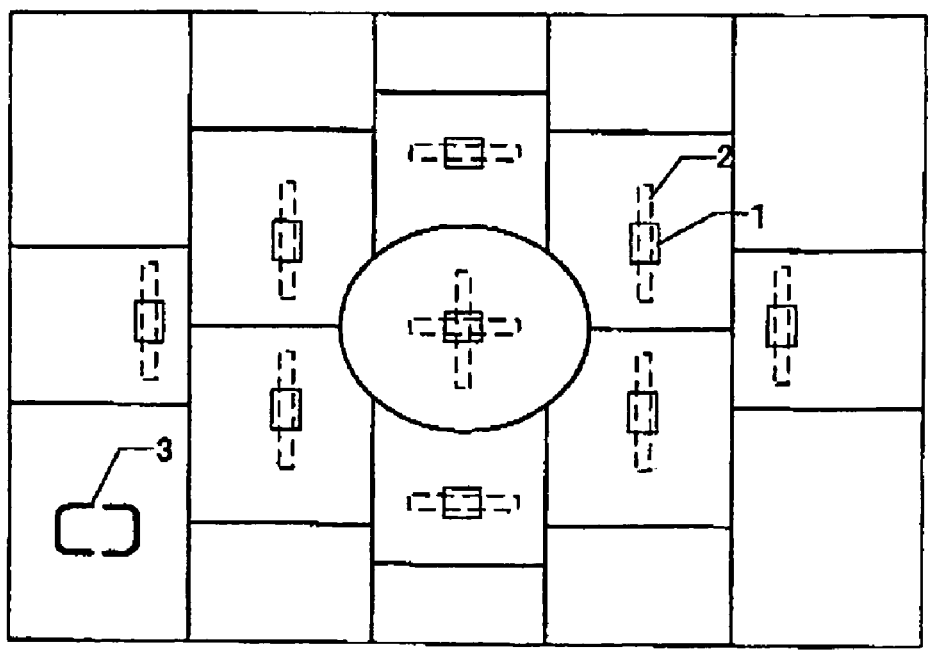

As shown in FIG. 6A, the photographic image plane may be divided into a plurality of blocks each centered on a specific phase detection AF area 1 and a phase detection AF area 1 and the contrast area AF area 3 may be judged to be in close proximity to each other if a phase detection AF area 1 is present within the block containing the contrast detection AF area 3 having been set. In the example presented in FIG. 6A, the phase detection AF area 1e is present within the block containing the contrast detection AF area 3 having been set although the contrast detection AF area 3 does not overlap either the phase detection AF area 1e or the corresponding range 2 detectable with the phase detection AF sensors. It is to be noted that if none of the phase detection AF areas 1 is present within the block containing the contrast detection AF area 3, as shown in FIG. 6B, the focus is adjusted through the contrast detection AF. If, on the other hand, the contrast detection AF area is set astride a plurality of blocks, the decision should be made in reference to the block containing the largest part of the contrast detection AF area 3.

While the camera achieved in the second embodiment, adopting the structure described above, realizes advantages similar to those of the camera in the first embodiment, it further realizes the following special advantage. Namely, even when the contrast detection AF area 3 does not overlap any of the phase detection AF areas or the ranges detectable with the phase detection AF sensors, the focus detection is executed through the hybrid method by using a phase detection AF area 1 present in close proximity to the contrast detection AF area 3. Since this enables even more effective utilization of the phase detection AF areas 1, the hybrid AF mode can be used over a wider operating range.

It is to be noted that while the photographic image plane is divided into a plurality of blocks in the second embodiment in order to facilitate the decision-making as to whether or not the hybrid AF mode can be engaged, the phase detection AF area 1 with the value representing the shortest distance among the distances between the center of the contrast detection AF area 3 and the centers of the individual phase detection AF areas 1a~1i may be judged to be the focusing area present in close proximity to the contrast detection AF area 3, as long as the value representing the distance is equal to or less than a predetermined value.

In addition, the plurality of blocks into which the photographic image plane is divided may range over a predetermined distance from the centers of the individual phase detection AF areas 1a~1i.

Third Embodiment

In reference to the third embodiment, an example in which the hybrid AF operation is executed when one of the phase detection AF areas is contained within a same subject area (a same subject range) or a single subject area containing the contrast detection AF area 3, even through the contrast detection AF area 3 does not overlap any of the phase detection AF areas 1. FIG. 1 should be referred to for details of the structure adopted in the camera equipped with a focus adjustment device in the third embodiment, which is similar to that of the camera equipped with the focus adjustment device achieved in the first embodiment.

Figure 7A:
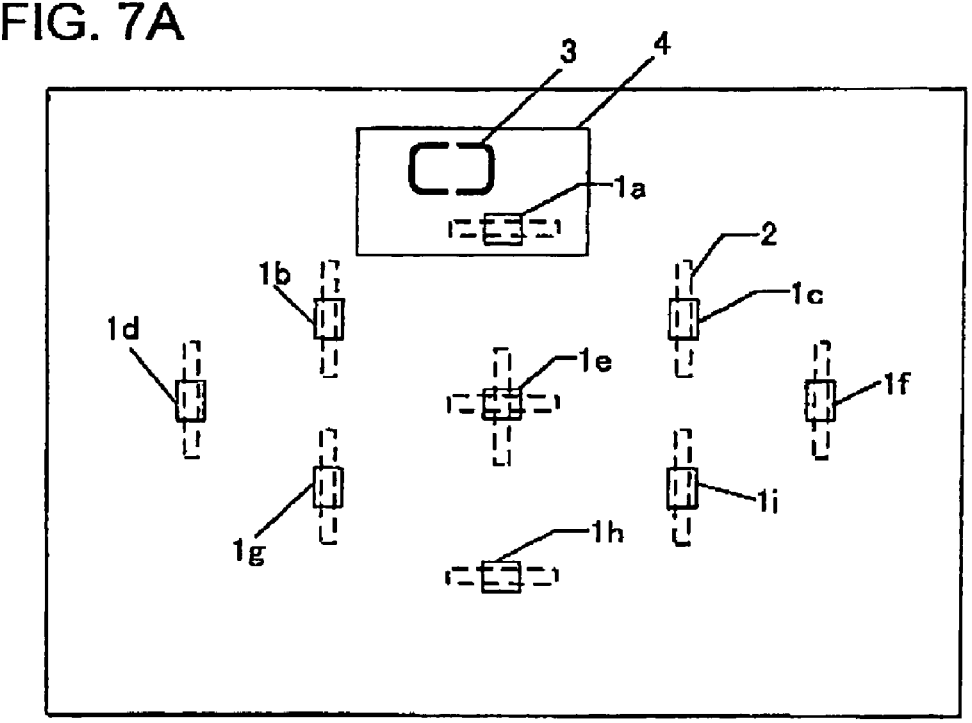
FIGS. 7A and 7B illustrate positional relationships between the phase detection AF areas and the contrast detection AF area that may be assumed in a third embodiment of the present invention.
Figure 7B:
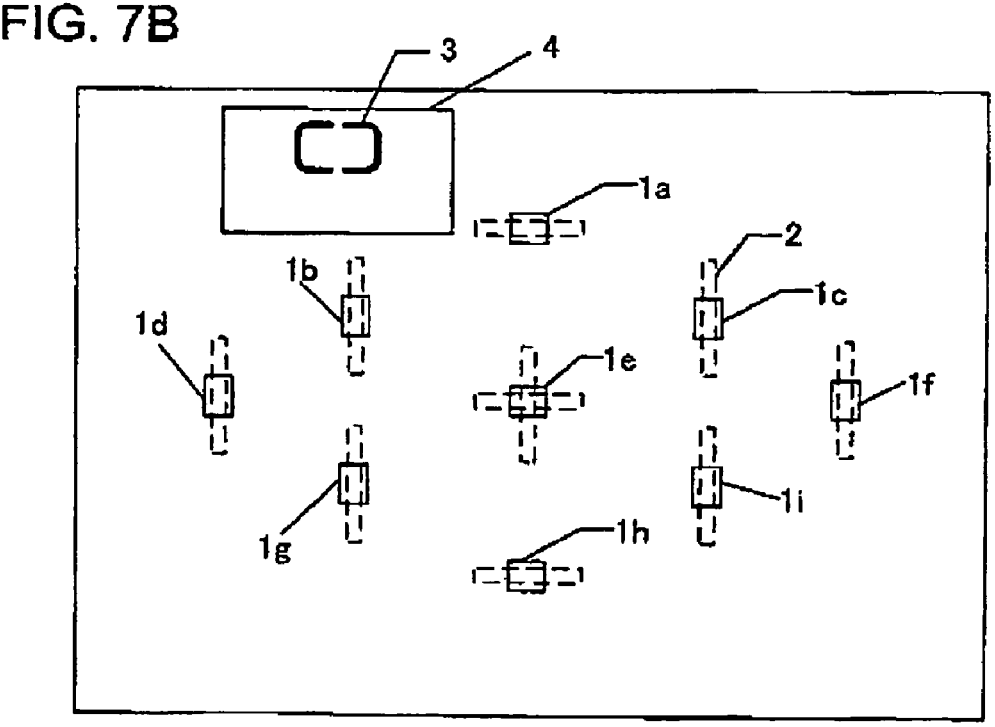

FIGS. 7A and 7B each show a positional relationship between the phase detection AF areas and the contrast detection AF area 3 that may be assumed in the third embodiment. The focusing areas for phase detection AF in the third embodiment are arranged in a manner similar to the arrangement of the focusing areas in FIG. 2 adopted in the first embodiment. FIG. 7A shows the phase detection AF area 1a contained within a same subject area 4 also containing the contrast detection AF area 3. Under conditions such as these, the hybrid AF operation is executed by combining the phase detection AF in which the phase detection AF area 1a is used and the contrast detection AF in which the contrast detection AF area 3 is used.

FIG. 7B shows no phase detection AF area 1 contained in the same subject area 4 containing the contrast detection AF area 3. Under these circumstances, the contrast detection AF operation alone is executed by using the contrast detection AF area 3.

Figure 8:
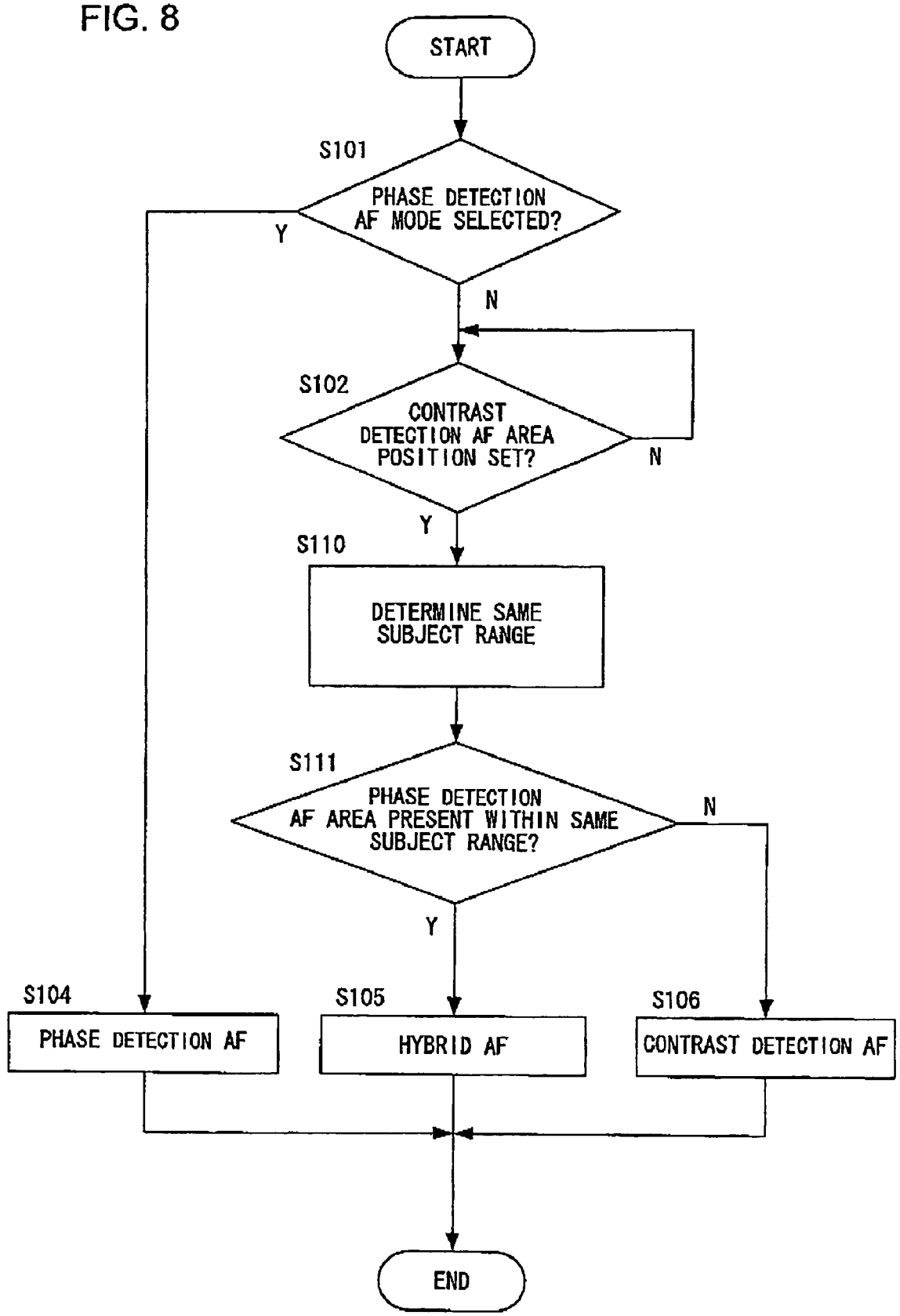
FIG. 8 presents a flowchart of the processing executed by the control circuit in the third embodiment.

FIG. 8 presents a flowchart of the processing executed by the control circuit 300 in the third embodiment. The same step numbers are assigned to steps in the flowchart in FIG. 8, in which processing identical to that in the corresponding steps in the flowchart in FIG. 4 is executed, so as to preclude the necessity for a repeated explanation thereof.

If an affirmative decision is made in step S102 in FIG. 8, i.e., if it is decided that the position of the contrast detection AF area 3 has been set, the operation proceeds to step S110. In step S110, the same subject area that is the area taken up by a subject which is a primary subject is determined. The primary subject is the subject for which the AF operation is executed over the contrast detection AF area 3. Namely, the primary subject is present at a position at which the contrast detection AF area 3 is also present, and the same subject area taken up by the primary subject is equivalent to the range over which uniformity is sustained for the subject. For instance, if the primary subject is a person's face, the same subject area is the skin-color range. In addition, if the outline of the face can be detected through edge detection, the same subject area is the range defined by the outline.

In step S111, a decision is made as to whether or not a specific positional relationship is achieved by the phase detection AF areas 1 and the contrast detection AF area 3, in other words, whether or not any of the phase detection AF areas 1 present within the same subject area. Upon making an affirmative decision in step S111, the operation proceeds to step S105 to adjust the focus through the hybrid AF. If, on the other hand, a negative decision is made in step S111, i.e., if it is decided that none of the phase detection AF areas 1 is present within the same subject area containing the contrast detection AF area 3, the operation proceeds to step S106 to adjust the focus through the contrast detection AF.

The camera in the third embodiment described above, too, achieves advantages similar to those of the camera in the first embodiment. In particular, even when the contrast detection AF area 3 does not overlap any of the phase detection AF areas 1, the hybrid AF operation can be executed for the same subject area as long as the contrast detection AF area 3 and a phase detection AF area 1 are present within the same subject area. As a result, a speedy and highly accurate AF operation can be executed for the primary subject.

Fourth Embodiment

In reference to the fourth embodiment, an example in which the AF driving direction is determined based upon the defocus distribution over phase detection AF areas present near the contrast detection AF area 3 when the contrast detection AF area 3 does not overlap any of the phase detection AF areas 1 is explained. FIG. 1 should be referred to for details of the structure adopted in the camera equipped with a focus adjustment device in the fourth embodiment, which is similar to that of the camera equipped with the focus adjustment device achieved in the first embodiment.

Figure 9A:
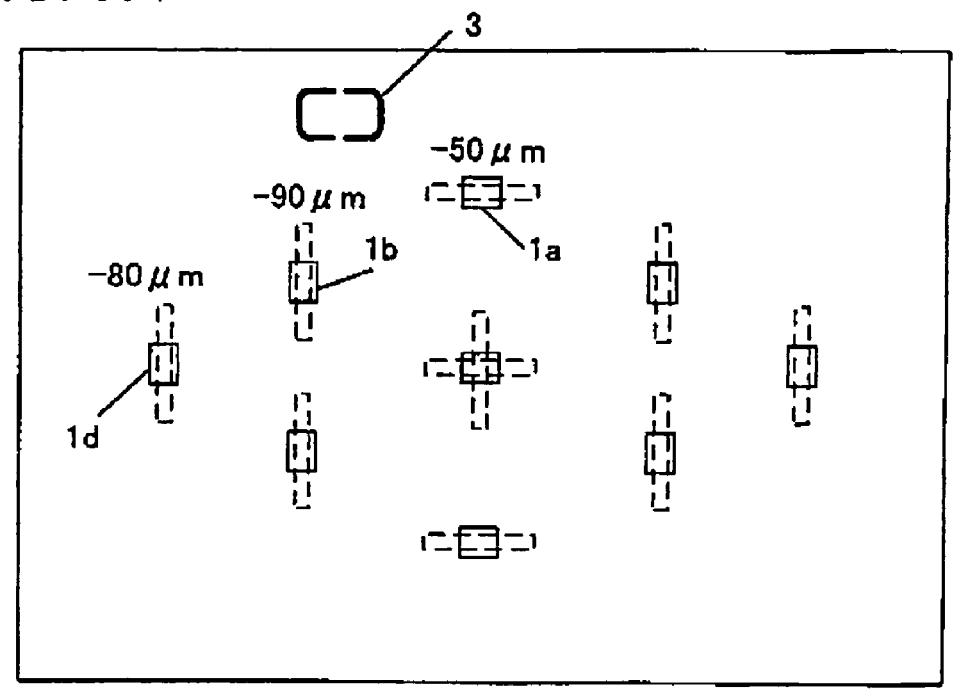
FIGS. 9A and 9B each show a defocus distribution that may be observed in the phase detection AF areas present near the contrast detection AF area in a fourth embodiment.
Figure 9B:
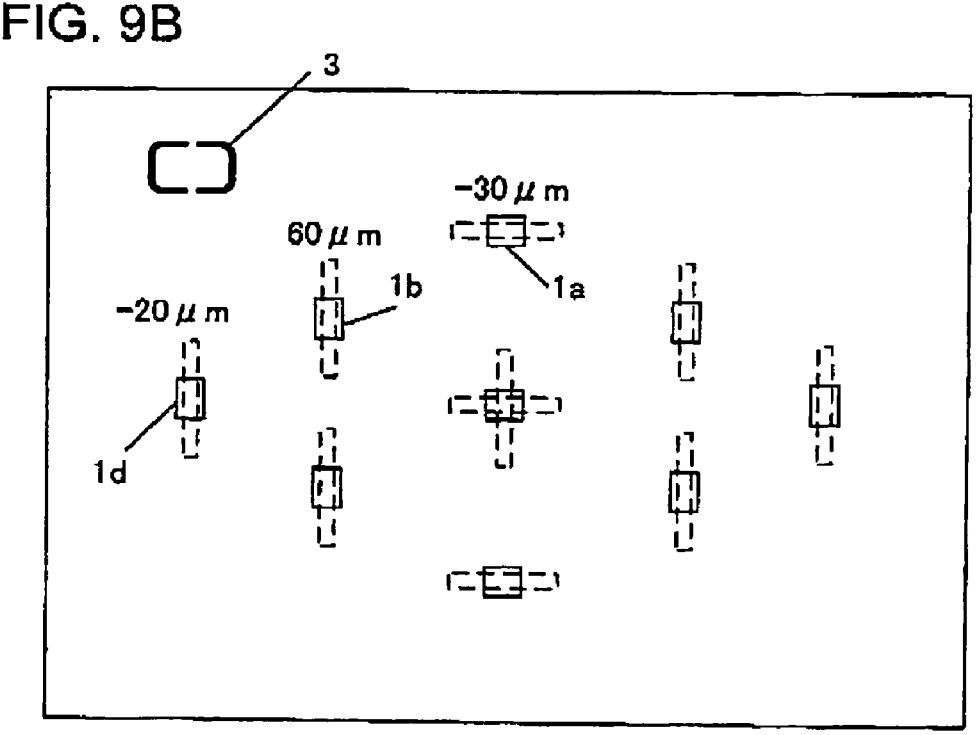

FIGS. 9A and 9B each show a defocus distribution over phase detection AF areas 1 present near the contrast detection AF area 3, that may be observed in the fourth embodiment. The focusing areas for phase detection AF in the fourth embodiment are arranged in a manner similar to the arrangement of the focusing areas in FIG. 2 adopted in the first embodiment.

In FIG. 9A, the defocus quantities calculated for the phase detection AF area 1a, the phase detection AF area 1b and the phase detection AF area 1d all present near the contrast detection AF area 3, are respectively −50 μm, −90 μm and −80 μm, which indicate that defocusing manifests in a single direction. Under these circumstances, the driving direction along which the focus lens is driven to achieve focusing can be ascertained with ease and, accordingly, the hybrid AF operation is executed. Namely, the hybrid AF operation, executed by first determining the focus lens driving direction based upon the directions of the defocus quantities calculated for the phase detection AF area 1a, the phase detection AF area 1b and the phase detection AF area 1d and then executing the contrast detection AF is executed based upon the contrast detection AF area 3 while driving the focus lens along the direction thus determined.

In the example presented in FIG. 9B, on the other hand, the defocus quantities calculated for the phase detection AF area 1a, the phase detection AF area 1b and the phase detection AF area 1d, present near the contrast detection AF area 3, are respectively −30 μm, 60 μm and −20 μm, and thus, defocusing manifests along varying directions. In this situation, it will be difficult to determine the focus lens driving direction based upon the range-finding data for the phase detection AF areas 1 and, accordingly, the focus adjustment is normally executed through the contrast detection AF alone based upon the contrast detection AF area 3.

Figure 10:
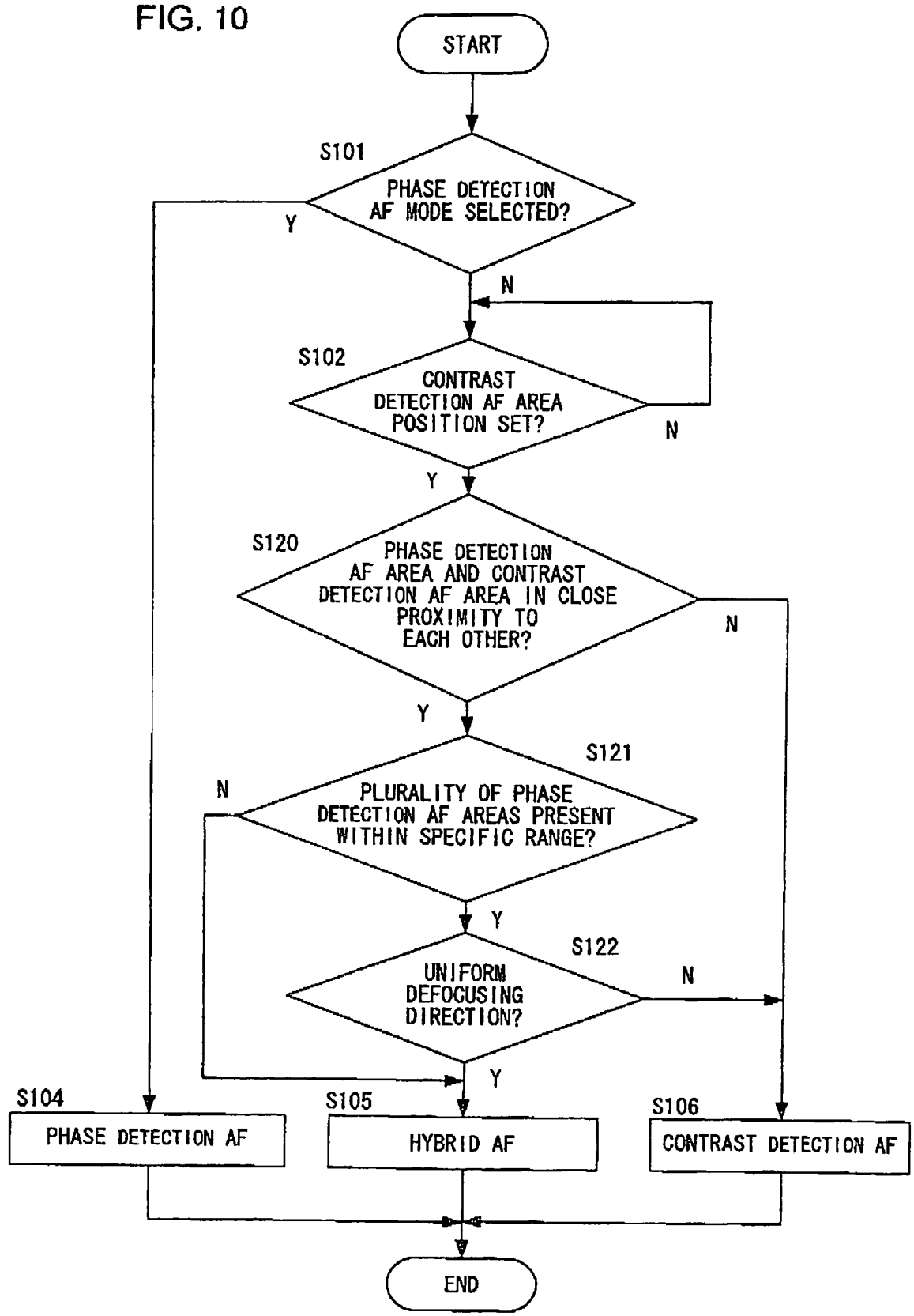
FIG. 10 presents a flowchart of the processing executed by the control circuit in the fourth embodiment.

FIG. 10 presents a flowchart of the processing executed by the control circuit 300 in the fourth embodiment. The same step numbers are assigned to steps in the flowchart in FIG. 10, in which processing identical to that in the corresponding steps in the flowchart in FIG. 4 is executed, so as to preclude the necessity for a repeated explanation thereof.

If an affirmative decision is made in step S102 in FIG. 10, i.e., if it is decided that the position of the contrast detection AF area 3 has been set, the operation proceeds to step S120. In step S120, a decision is made as to whether or not there are any phase detection AF areas 1 present in close proximity to the contrast detection AF area 3. If an affirmative decision is made in step S120, the operation proceeds to step S121. In step S121, a decision is made as to whether or not there is a plurality of phase detection AF areas 1 present in close proximity to the contrast detection AF area 3. In other words, a decision is made with regard to exactly how many phase detection AF areas 1 are present within a specific range around the contrast detection AF area 3.

If it is decided in step S121 that there are a plurality of phase detection AF areas, the operation proceeds to step S122 to make a decision as to whether or not defocusing at all the phase detection AF areas 1 manifests along a single direction. If it is decided in step S122 that defocusing manifests at all the plurality of phase detection AF areas 1 along a single direction, the operation proceeds to step S105 to execute the hybrid AF operation mentioned above. The operation also proceeds to step S105 to execute the above hybrid AF operation if it is decided in step S121 that there is only one phase detection AF area 1 present in close proximity to the contrast detection AF area.

If it is decided in step S122 that the defocusing at the plurality of phase detection AF areas 1 all manifests along a single direction, the hybrid AF operation is executed in step S105 by determining the focus lens driving direction based upon the defocus quantities calculated for the plurality of phase detection AF areas 1 and executing the contrast detection AF while driving the focus lens along the direction thus determined If it is decided in step S121 that there is only one phase detection AF area 1 present in close proximity, too, the hybrid AF operation is executed by determining the focus lens driving direction based upon the defocus quantity calculated for the single phase detection AF area 1 and executing the contrast detection AF while driving the focus lens along the direction thus determined.

If, on the other hand, it is decided in step S120 that there is no phase detection AF area 1 present in close proximity to the contact AF area 3, the operation proceeds to step S106 to adjust the focus normally through the contrast detection AF alone based upon the contrast detection AF area 3. In addition, if it is decided in step S122 that the defocusing at the plurality of phase detection AF areas 1 manifest along varying directions, too, the operation proceeds to step S106 to adjust the focus normally through the contrast detection AF alone based upon the contrast detection AF area 3.

In the camera achieved in the fourth embodiment described above, the focus lens driving direction can be determined based upon the defocusing quantities calculated for a plurality of phase detection AF areas 1 present in close proximity to the contrast detection AF area 3 even when the contrast detection AF area 3 does not overlap any of the phase detection AF areas 1. Once the drive-direction for the contrast detection AF is determined based upon the defocus quantities calculated for the phase detection AF areas 1 as described above, the AF operation can be executed speedily with a high level of precision. It is to be noted that while an explanation is given in reference to the fourth embodiment on an example in which only the drive-direction is determined based upon the defocus quantities calculated for the plurality of phase detection AF areas 1, the drive quantity may also be determined.

An explanation is given above in reference to the first through fourth embodiment on an example in which the photographer operates the contrast detection AF area selecting operation unit 270 to manually set the contrast detection AF area 3 at a desired position in step S102. Instead, the primary subject may be automatically determined through image processing and the contrast detection AF area 3 may be automatically set at the primary subject position. In such a case, the face of a person may be detected through edge detection or skin color detection and the area thus detected may then be designated as the same subject area which is the primary subject area. In addition, the primary subject may be detected by adopting any of various other methods of the known art.

The phase detection AF areas 1 explained above may be arranged in a manner other than that shown in FIGS. 2, 3, 6A, 6B, 7A, 7B, 9A and 9B. In addition, the image plane may be divided into blocks through a pattern other than that shown in FIGS. 6A and 6B. Also, while an explanation is given above on an example in which the phase detection AF and the contrast detection AF are adopted in combination, the present invention is not limited to this particular combination and may be adopted in any of various hybrid AF operations executed by combining two different AF methods. For instance, the present invention may be adopted in a hybrid AF combining the contrast detection AF and an external light passive AF or combining the contrast detection AF and an active AF which uses infrared light. Furthermore, the present invention is not limited in any way whatsoever by the specific embodiments of the phase detection AF and the contrast detection AF described above.

While an explanation is given above in reference to the embodiments on an example in which the present invention is adopted in a camera with an exchangeable lens barrel, the present invention is not limited to this example and may be adopted in a camera with an integrated lens.

The above described embodiments are examples, and various modifications can be made without departing from the spirit and scope of the invention.

What is claimed is:

1. A focus adjustment device, comprising:
    an image sensor that captures a subject image;
    a first focus detection unit that detects a focus adjustment state of the subject image on the image sensor in a first focusing area;
    a second focus detection unit that detects a focus adjustment state of the subject image on the image sensor in a second focusing area through a method different from a method adopted by the first focus detection unit;
    a judgment unit that makes a judgment as to whether or not the first focusing area and the second focusing area have a specific positional relationship;
    a focus adjustment unit that executes focus adjustment of the subject image on the image sensor by using both successful focus detection results obtained via the first focus detection unit and successful focus detection results obtained via the second focus detection unit when the judgment unit decides that the first focusing area and the second focusing area have the specific positional; and
    the specific positional relationship being one of a positional relationship in which the first focusing area and the second focusing area at least partially overlap and a positional relationship in which the first focusing area and the second focusing area are present in close proximity to each other.

2. A focus adjustment device according to claim 1, further comprising:
    a second area setting unit that sets the second focusing area in correspondence to an optional position within an image plane.

3. A focus adjustment device according to claim 1, wherein:
    the focus adjustment unit first executes focus adjustment to be close to a state in focus based upon the focus detection results obtained via the first focus detection unit and then executes focus adjustment based upon the focus detection results obtained via the second focus detection unit.

4. A focus adjustment device according to claim 1, wherein:
    the first focus detection unit detects the focus adjustment state in a plurality of focusing areas; and
    the focus adjustment device further comprises a first area setting unit that sets at least one focusing area as the first focusing area.

5. A focus adjustment device according to claim 1, wherein:
    when the first focusing area and the second focusing area do not have the specific positional relationship, the focus adjustment unit executes focus adjustment based upon the focus detection results obtained via the second focus detection unit.

6. A focus adjustment device according to claim 1, further comprising:
    a subject area definition unit that defines a subject area corresponding to a subject assuming a position in the second focusing area, wherein:
    the judgment unit makes a judgment as to whether or not the first focusing area is present within the subject area defined via the subject area definition unit.

7. A focus adjustment device according to claim 2, further comprising:
    a subject area definition unit that defines a subject area corresponding to a subject assuming a position in the second focusing area defined via the second area setting unit, wherein:
    the judgment unit makes a judgment as to whether or not the first focusing area is present within the subject area defined via the subject area definition unit.

8. A focus adjustment device according to claim 1, wherein:
    when the judgment unit decides that there is a plurality of first focusing areas having the specific positional relationship to the second focusing area, the focus adjustment unit executes the focus adjustment based upon focus detection results provided by the first focus detection unit for the plurality of first focusing areas.

9. A focus adjustment device according to claim 8, wherein:
    the focus adjustment unit determines a lens driving direction along which a lens is to be driven for the focus adjustment by the second focus detection unit based upon the focus detection results obtained via the first focus detection unit for the plurality of focusing areas.

10. A focus adjustment device according to claim 1, wherein:
    the first focus detection unit executes a phase detection method; and
    the second focus detection unit executes a contrast detection method.

11. A focus adjustment method, comprising:
    making a judgment as to whether or not a first focusing area detecting a focus adjustment state of a subject image on an image sensor, which captures the subject image, through a first focus detection method and a second focusing area detecting a focus adjustment state of the subject image on the image sensor achieved through a second focus detection method different from the first focus detection method, have a specific positional relationship;
    executing focus adjustment by using both successful focus detection results obtained through the first focus detection method and successful focus detection results obtained through the second focus detection method when the first focusing area and the second focusing area are determined to have the specific positional relationship; and
    the specific positional relationship being one of a positional relationship in which the first focusing area and the second focusing area at least partially overlap and a positional relationship in which the first focusing area and the second focusing area are present in close proximity to each other.

12. A focus adjustment method according to claim 11, further comprising:
    setting the second focusing area in correspondence to an optional position within an image plane.

13. A focus adjustment method according to claim 11, wherein:
    focus adjustment is first executed to be close to a state in focus based upon the focus detection results obtained through the first focus detection method and then focus adjustment is executed based upon the focus detection results obtained through the second focus detection method.

14. A focus adjustment method according to claim 11, wherein:

the focus adjustment state is detected in a plurality of focusing areas through the first focus detection method and at least one of the focusing areas is designated as the first focusing area.

15. A focus adjustment method according to claim 11, wherein:

when the first focusing area and the second focusing area do not have the specific positional relationship, focus adjustment is executed based upon the focus detection results obtained through the second focus detection method.

16. A focus adjustment method according to claim 11, wherein:

a subject area corresponding to a subject assuming a position in the second focusing area is defined; and a judgment as to whether or not the first focusing area and the second focusing area have the specific positional relationship is made by judging whether or not the first focusing area is present within the subject area having been defined.

17. A focus adjustment method according to claim 12, wherein:

a subject area corresponding to a subject assuming a position in the second focusing area having been defined; and the judgment as to whether or not the first focusing area and the second focusing area have the specific positional relationship is made by judging whether or not the first focusing area is present within the subject area having been defined.

18. A focus adjustment method according to claim 11, wherein:

when a plurality of first focusing areas are judged to have the specific positional relationship to the second focusing area, the focus adjustment is executed based upon the focus detection results obtained through the first focus detection method for the plurality of first focusing areas.

19. A focus adjustment method according to claim 18, wherein:

a lens driving direction along which a lens is to be driven for the focus adjustment through the second focus detection method, is determined based upon the focus detection results obtained through the first focus detection method for the plurality of first focusing areas.

20. A focus adjustment method according to claim 11, wherein:

the first focus detection method is a phase detection method; and the second focus detection method is a contrast detection method.

21. A camera comprising the focus adjustment device according to claim 1.

22. A focus adjustment device according to claim 1, wherein:

the focus adjustment unit determines a lens driving direction along which a lens is to be driven for the focus adjustment by the second focus detection unit based upon the focus detection results obtained via the first focus detection unit.

23. A focus adjustment method according to claim 11, wherein:

a lens driving direction along which a lens is to be driven for the focus adjustment by the second focus detection method is determined based upon the focus detection results obtained via the first focus detection method.

\* \* \* \* \*